US006932483B2

United States Patent
Strumolo et al.

(10) Patent No.: US 6,932,483 B2
(45) Date of Patent: *Aug. 23, 2005

(54) VEHICULAR MIRROR

(75) Inventors: Gary Steven Strumolo, Beverly Hills, MI (US); Jeffry Allen Greenberg, Ann Arbor, MI (US); Louis Tijerina, Columbus, OH (US); Ronald Hugh Miller, Saline, MI (US)

(73) Assignee: Ford Global Technologies, LLC, Dearborn, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 61 days.

(21) Appl. No.: 09/580,056

(22) Filed: May 27, 2000

(65) Prior Publication Data

US 2004/0027697 A1 Feb. 12, 2004

(51) Int. Cl.[7] ................................................ G02B 5/10
(52) U.S. Cl. ....................................... 359/864; 359/877
(58) Field of Search ................................ 359/850, 864, 359/866, 868, 871, 872

(56) References Cited

U.S. PATENT DOCUMENTS

| 2,778,273 | A | * | 1/1957 | Fellmeth | 359/864 |
| 4,245,894 | A | * | 1/1981 | Luchtenberg | 359/866 |
| 4,264,144 | A | * | 4/1981 | McCord | 359/868 |
| 4,306,770 | A | * | 12/1981 | Marhauer | 359/864 |
| 4,331,382 | A | | 5/1982 | Graff | |
| 4,449,786 | A | * | 5/1984 | McCord | 359/868 |
| 4,575,202 | A | | 3/1986 | McGuire | |
| 5,005,962 | A | * | 4/1991 | Edelman | 359/864 |
| 5,579,133 | A | * | 11/1996 | Black et al. | 359/866 |
| 5,793,542 | A | * | 8/1998 | Kondo et al. | 359/864 |
| 5,796,532 | A | * | 8/1998 | Kanazawa | 359/858 |
| 6,522,451 | B1 | * | 2/2003 | Lynam | 359/265 |

FOREIGN PATENT DOCUMENTS

GB        2 092 534    *   8/1982 ................. 359/868

* cited by examiner

*Primary Examiner*—Mark A. Robinson
(74) *Attorney, Agent, or Firm*—David B. Kelley; Tung & Associates

(57) ABSTRACT

A vehicular mirror 12 having a first curved portion 18 and a second substantially planar portion 16. The first curved portion 18 is deployed in close proximity to the vehicle 10, thereby substantially eliminating the conventional "blind spot" while concomitantly providing a relatively wide field of view.

7 Claims, 2 Drawing Sheets

VEHICULAR MIRROR

(1) Field of the Invention

The present invention generally relates to a vehicular mirror and more particularly, to a side view type of vehicular mirror having a relatively wide field of view and being adapted to display images of objects in close proximity to the vehicle upon which the mirror is mounted, thereby substantially eliminating the "blind spot" which is usually associated with traditional vehicular side view type of mirrors.

(2) Background of the Invention

A pair of mirrors are typically disposed upon a vehicle in order to allow the driver and occupants of the vehicle to view objects and/or a portion of the vehicular ambient environment which is located behind the driver or to the "rear" and/or along a side of the vehicle. Particularly, each of these mirrors are respectively placed upon a unique one of the front doors of the vehicle, thereby respectively residing proximate to the driver of the vehicle and to the passenger seated next to the driver. These mirrors are selectively adjustable, and the mirror which is proximate to the driver is typically planar while the other mirror is typically convex.

While these mirrors do provide images of areas and objects located to the rear and/or to the side of the vehicle, they suffer from some drawbacks. Particularly, one or more "blind spots" typically exist and are associated with the use of these conventional mirrors. As shown, these blind spots comprise areas or locations, proximate to the vehicle, which are not displayed upon the mirrors due to the planar configuration and/or the limited viewing arc of each of the mirrors.

While these blind spots may be substantially eliminated by "turning" or positioning the mirrors outwardly from the vehicle, such positioning undesirably restricts or limits the amount of the environment which is displayed and causes other blind spots to be created. This "repositioning" also causes the displayed images to "quickly" appear upon the mirror and to appear to "float". Both of these conditions fail to give the driver proper and desirable visual "clues" regarding the exact shape or nature of a displayed object and the "true" distance between the displayed object and the vehicle.

One attempt to overcome this drawback is described within U.S. Pat. No. 4,331,382 ("the '382 patent") which is fully and completely incorporated herein by reference, word for word and paragraph for paragraph. Particularly, in the '382 patent, a mirror having two sections is described. The first section is planar and the second section is generally convex, having a, nearly constant radius of curvature. Moreover, the second section is located or disposed at the outermost portion of the mirror (i.e., upon the portion of the mirror which is distant from the vehicle). While these blind spots are eliminated, this prior mirror configuration undesirably makes the displayed objects appear to be a certain and inaccurate distance from the vehicle, thereby undesirably causing confusion and distraction, especially as the vehicle is maneuvered from one lane to another.

It may therefore by desirable to provide a mirror that substantially eliminates the previously delineated blind spot while concomitantly providing a relatively wide field of view and which overcomes at least some of the previously delineated drawbacks.

SUMMARY OF THR INVENTION

It is a first object of the present invention to provide a vehicular mirror that overcomes at least some of the previously delineated drawbacks of prior vehicular mirrors.

It is a second object of the present invention to provide a vehicular mirror which overcomes at least some of the previously delineated drawbacks of prior vehicular mirrors and which, by way of example and without limitation, substantially eliminates traditionally provided "blind spots" while concomitantly providing a relatively large field of view.

According to a first aspect of the present invention, a mirror is provided. The mirror includes a first planar portion and a second curved portion that selectively resides proximate to a vehicle.

According to a second aspect of the present invention a vehicular mirror is provided. The mirror includes a first continuously varying curved portion and a second relatively flat portion.

These and other aspects, features, and embodiments of the invention will become apparent from a reading of the following detailed description of the preferred embodiment of the invention and by reference to the following drawings.

DETAILED DESCRIPTION OF THE PREFERRED EMBODIMENT OF THE INVENTION

Figure 1:
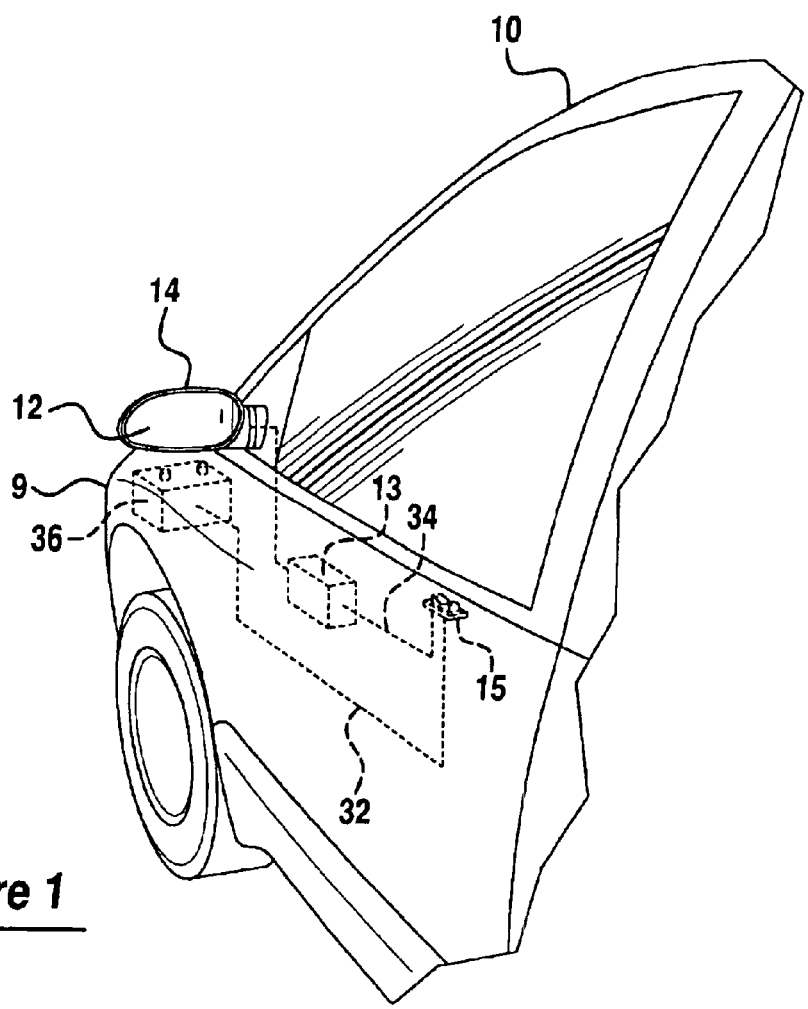
FIG. 1 is a fragmented perspective view of a vehicle incorporating a mirror which is made in accordance with the preferred embodiment of the invention.

Referring now to FIG. 1, there is shown a vehicle 10 upon which at least one mirror 12 is operatively disposed. Particularly, mirror 12 is made in accordance with the teachings of the preferred embodiment of the invention and is disposed, in one non-limiting embodiment, within a conventional vehicular side view mirror type of protective shroud 14. It should be realized that while only one mirror 12 is shown in FIG. 1, vehicle 10 may have a second type of mirror which is disposed upon the opposite side of the vehicle 10 to that which is shown in FIG. 1, which is further contained within another conventional rear view mirror shroud (not shown), and which may be substantially identical to mirror 12. Accordingly, the following description of mirror 12 identically and/or equally applies to this second selectively deployed mirror.

Figure 2:
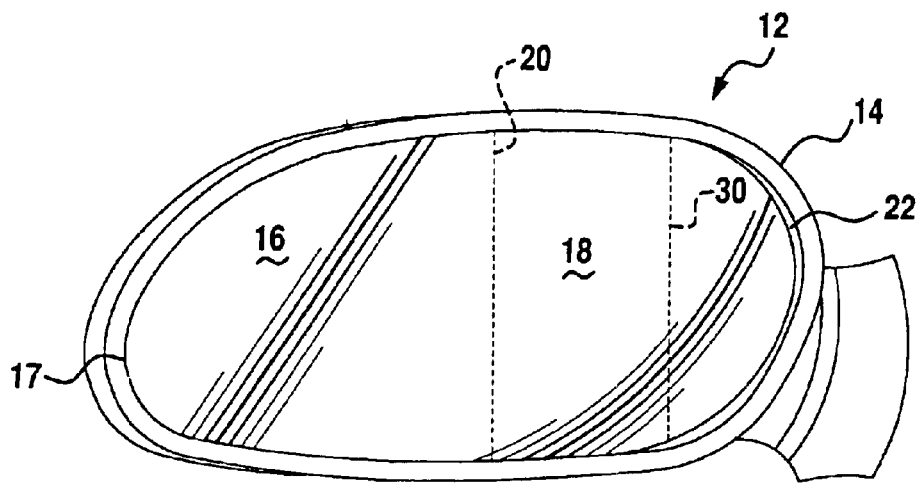
FIG. 2 is an exploded view of the mirror which is shown in FIG. 1.
Figure 3:
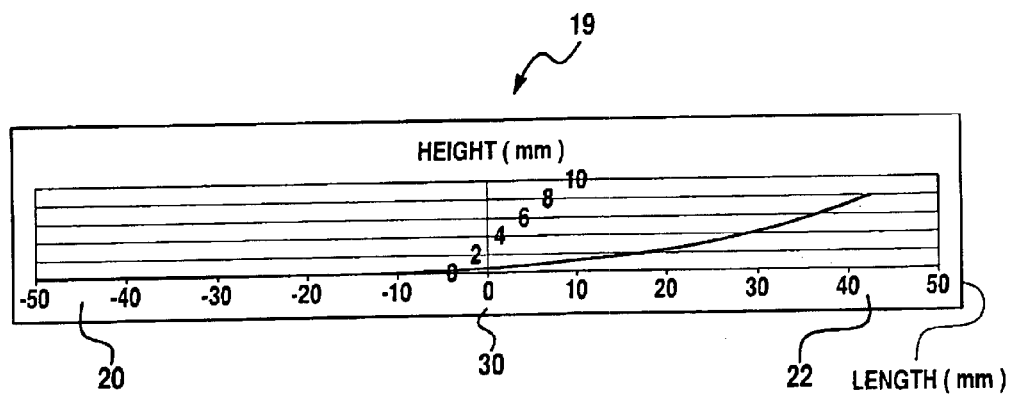
FIG. 3 is a graph illustrating the relationship between the height and the length of the mirror which is shown in FIGS. 1 and 2.
Figure 4:
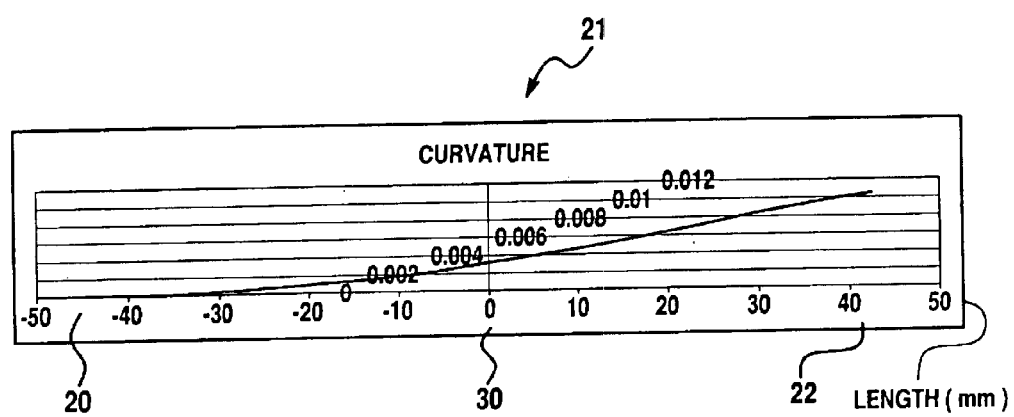
FIG. 4 is a graph illustrating the relationship between the curvature and the length of the mirror which is shown in FIG. 1 and FIG. 2.

As shown best in FIGS. 2, 3, and 4, mirror 12 includes a first substantially planar portion 16 and a second curved portion 18 which is operatively disposed proximate to the vehicle 10. In one non-limiting embodiment of the invention, portion 18 curves in a direction "towards" the front 9 of vehicle 10 in a generally convex manner and comprises about one half of the length of the mirror 12 (i.e., port ions 16 and 18 "meet" along central axis 20).

It should further be realized that mirror 12 is positionally adjustable by the use of motor assembly 13 and a switch assembly 15 which is coupled to the vehicle battery 36 by the use of bus 32 and which is coupled to the motor assembly 13 by the use of bus 34, thereby cooperating with mirror 12 to form a mirror assembly.

In operation, upon the movement of switch assembly 15 to a first position, electrical power is coupled or sourced to the motor assembly 13 by battery 36 and busses 32 and 34, thereby causing the mirror 12 to move in a first direction. Such movement stops when the switch 15 is moved back to an initial position. Movement of the switch 15 to a second position similarly causes the mirror 12 to move in a direction opposite to the direction the mirror 12 moved when switch 15 was placed in a first position. Such movement stops when the switch assembly 15 is moved to an initial position.

As best shown in graph 19 of FIG. 3, portion 18 has a height (i.e., the amount by which the surface of the mirror 12 outwardly projects in a direction toward the rear of vehicle 10) which increases from the height of portion 16 (i.e., shown as a reference height of zero) to a height of about 8 millimeters along a direction extending from axis 20 to the curved end 22 of the mirror portion 18. Further, as best shown in graph 21 of FIG. 4, beginning at about axis 20 and extending to edge 22, mirror 12 has a continuously varying curvature which is measured in graph 21 by a metric which is inversely proportional to a radius of curvature. This continuously varying curvature substantially eliminates undesired "jumps" in the displayed image and reduces eye fatigue. Further, in one non-limiting embodiment of the invention, the cross sectional area of portion 18, as shown in FIG. 3, forms or comprises a portion of an ellipse.

In another non-limiting embodiment, mirror 12 further includes a "score" line 30 that may be used to properly position the mirror 12 relative to the vehicle 10. That is, in operation, the driver visually aligns score line 30 with a portion (i.e., the rear portion) of vehicle by placing switch 15 in a first position thereby allowing the mirror 12 to be positioned in a desired and previously delineated manner. Switch 15 may then be placed in a third position, causing mirror 12 to be rotated by a certain predetermined amount (i.e., in one non-limiting embodiment about seven to about eight degrees) which is effective to substantially eliminate the conventional blind spot while obtaining the desired and relatively wide viewing range.

It should be realized that the placement of convex portion 18 proximate to the vehicle 10 substantially eliminates the typical blind spot and that the outwardly extending and generally planar portion 16 allows for the acquisition and display of images of objects and/or portions of the vehicular ambient environment which reside and/or "lie" outside of the typical blind spot area but which are nonetheless relatively close to the vehicle 10.

As shown in FIG. 2, the region of portion 18 to the right of line 30 (i.e., closest to vehicle 10) provides a "false" measure of distance. That is, objects appearing upon this region of portion 18 of the mirror 12 appear closer to vehicle 10 than they actually are. This false measure of distance, provided by this region of portion 18, is not a highly undesirable characteristic since the objects viewed within this section of the mirror 12 are generally identified only to place them in proper perspective with other objects which appear in other portions of the mirror 12 and such a "false" measure of distance is not particularly troubling to a driver. Portion 16, and the part of portion 18 which resides to the left of line 30, provide a substantially "true" measure of distance.

It is to be understood that the invention is not limited to the exact construction and method which has been previously delineated, but that various changes and modifications may be made without departing from the spirit and the scope of the invention as delineated in the following claims.

What is claimed is:

1. A vehicular mirror assembly which may be selectively attached to a vehicle exterior, said vehicular mirror assembly comprising:
   a rear-view mirror protective shroud;
   a mirror which is wholly and operatively disposed within said protective shroud and having a first half which is proximate to said vehicle and which curves away from a driver of said vehicle and a second planar hall which is distal to said vehicle and continuous with said first half, said first half having a height which varies from about zero millimeters to about eight millimeters and which has a continually varying curvature, said mirror further having a score line which is resident upon said first half; and
   a switch assembly having a selectively depressible switch member which causes said mirror to move to a predetermined position upon being depressed.

2. The vehicular mirror assembly of claim 1 wherein said first half comprises a first portion which provides a first image of an object having a substantially true measure of distance and a second portion which is proximate to said vehicle and which provides a second image of a second object having a false measure of distance.

3. The vehicular mirror assembly of claim 2 wherein said score line is disposed between said first portion and said second portion of said first half thereby separating said first image of an object having a substantially true measure of distance from said second image of a second object having a false measure of distance.

4. The vehicular mirror assembly of claim 1 wherein said continuously varying curvature is inversely proportional to a radius of curvature.

5. A method for increasing the rearward viewing range of a driver of a vehicle, said method comprising the steps of:
   providing a mirror assembly having a mirror with a planar half and a curved half, wherein said curved half has a height which varies from about zero millimeters to about eight millimeters and which has a continually varying curvature, said curved half having a first portion which is proximate to said planar half and which provides a first image having a substantially true measure of distance and a second portion which provides a second image having a false measure of distance;
   forming a score line upon said curved half between said first portion and said second portion, effective to separate said first image from said second image;
   coupling said mirror assembly to an exterior of said vehicle, wherein said planar half of said mirror is distal to said vehicle and said curved half of said mirror is proximate to said vehicle; and
   adjusting said mirror assembly to cause said score line to be visually aligned with a rear portion of said vehicle.

6. The method of claim 5 wherein said continuously varying curvature is inversely proportional to a radius of curvature.

7. The method of claim 5 wherein said step of coupling said mirror assembly to an exterior of said vehicle further comprises the steps of:
   providing a mirror housing;
   mounting said mirror assembly within said mirror housing; and
   coupling said mirror housing to a driver's-side of said vehicle exterior.

* * * * *